US010083715B2

(12) United States Patent
Sakamoto et al.

(10) Patent No.: US 10,083,715 B2
(45) Date of Patent: Sep. 25, 2018

(54) METHOD OF MANUFACTURING A PERPENDICULAR MAGNETIC DISC (75) Inventors: Kazuaki Sakamoto, Singapore (SG); Takenori Kajiwara, Singapore (SG)

(73) Assignee: WD MEDIA (SINGAPORE) PTE.LTD., Irvine, CA (US)

( * ) Notice: Subject to any disclaimer, the term of this patent is extended or adjusted under 35 U.S.C. 154(b) by 193 days.

(21) Appl. No.: 13/149,633

(22) Filed: May 31, 2011

(65) Prior Publication Data
US 2012/0207919 A1 Aug. 16, 2012

(30) Foreign Application Priority Data

May 28, 2010 (JP) ................................ 2010-122588

(51) Int. Cl.
*G11B 5/66* (2006.01)
*G11B 5/65* (2006.01)
*G11B 5/73* (2006.01)
*G11B 5/84* (2006.01)

(52) U.S. Cl.
CPC .............. *G11B 5/65* (2013.01); *G11B 5/7325* (2013.01); *G11B 5/8404* (2013.01)

(58) Field of Classification Search
CPC ......... G11B 5/84; G11B 5/667; G11B 5/7325; G11B 5/65; G11B 5/8404; G11B 5/66
USPC ..................... 427/131, 130; 1/131
See application file for complete search history.

(56) References Cited

U.S. PATENT DOCUMENTS

| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |

(Continued)

FOREIGN PATENT DOCUMENTS

| JP | H07-334832 | 12/1995 |
| JP | 2002-197630 | 7/2002 |

(Continued)

OTHER PUBLICATIONS

Japanese Office Action dated May 27, 2014 for related Japanese Patent Application No. 2010-122588, 7 pages.

*Primary Examiner* — Tabassom Tadayyon Eslami
(74) *Attorney, Agent, or Firm* — Foley & Lardner LLP (57) ABSTRACT A method of manufacturing a perpendicular magnetic disk comprises forming, on a base, a film of a first ground layer made of Ru or a Ru alloy at a first pressure, forming, on the first ground layer, a film of a second ground layer made of Ru or a Ru alloy at a second pressure higher than a first pressure, forming, on the second ground layer, a film of a third ground layer having Ru or a Ru alloy as a main component and an oxide as an accessory component at a third pressure higher than the first pressure and lower than the second pressure, and forming, on a layer above the third ground layer, a film of a granular magnetic layer in which a non-magnetic substance having an oxide is segregated around magnetic particles having an CoCrPt alloy grown in a columnar shape to form a grain boundary.

13 Claims, 2 Drawing Sheets

(56) References Cited

U.S. PATENT DOCUMENTS

| | | |
|---|---|---|
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |

(56) References Cited

U.S. PATENT DOCUMENTS

| | | |
|---|---|---|
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 2002/0060883 A1 | 5/2002 | Suzuki |
| 2003/0022024 A1 | 1/2003 | Wachenschwanz |
| 2003/0170500 A1* | 9/2003 | Shimizu et al. ....... 428/694 TM |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2004/0247945 A1* | 12/2004 | Chen et al. ............. 428/694 TS |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0196641 A1* | 9/2005 | Shibata ..................... G11B 5/66 428/829 |
| 2005/0263401 A1 | 12/2005 | Olsen et al. |
| 2006/0057431 A1* | 3/2006 | Tamai et al. .............. 428/836.2 |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2007/0254189 A1* | 11/2007 | Nakagawa et al. ........ 428/828.1 |
| 2008/0075845 A1 | 3/2008 | Sonobe et al. |
| 2008/0093760 A1 | 4/2008 | Harper et al. |
| 2009/0052074 A1* | 2/2009 | Nakagawa ............... G11B 5/65 360/39 |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0112379 A1* | 5/2010 | Umezawa et al. ......... 428/846.6 |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1* | 7/2011 | Tachibana et al. ............ 428/831 |
| 2011/0206947 A1 | 8/2011 | Tachibana et al. |
| 2011/0212346 A1* | 9/2011 | Onoue et al. ................ 428/828 |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1* | 7/2012 | Koike et al. ................... 427/131 |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |

(56) References Cited

U.S. PATENT DOCUMENTS

| | | |
|---|---|---|
| 2013/0165029 A1 | 6/2013 | Sun |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |

FOREIGN PATENT DOCUMENTS

| | | | | |
|---|---|---|---|---|
| JP | 2006-085742 | 3/2006 | | |
| JP | 2008-140460 | 6/2008 | | |
| WO | WO 2010032766 A1 * | 3/2010 | ............... | G11B 5/64 |
| WO | 2010/035810 | 4/2010 | | |
| WO | WO 2010137534 A1 * | 12/2010 | ............... | G11B 5/73 |

\* cited by examiner

| SAMPLE No. | COMPOSITION | | FILM-FORMATION PRESSURE (Pa) | | FILM THICKNESS | | SNR (dB) | RELIABILITY TEST |
|---|---|---|---|---|---|---|---|---|
| | SECOND GROUND LAYER | THIRD GROUND LAYER | SECOND GROUND LAYER | THIRD GROUND LAYER | SECOND GROUND LAYER | THIRD GROUND LAYER | | |
| 1-1 | Ru | Ru-3SiO2 | 3 | 4 | 8 | 2 | 15.90 | AA |
| 1-2 | Ru | Ru-3SiO2 | 6 | 4 | 8 | 2 | 16.30 | AA |
| 1-3 | Ru | Ru-3SiO2 | 9 | 4 | 8 | 2 | 16.31 | A |
| 1-4 | Ru | Ru-3SiO2 | 12 | 4 | 8 | 2 | 16.05 | C |
| 1-5 | Ru | Ru-3SiO2 | 6 | 1 | 8 | 2 | 15.80 | AA |
| 1-6 | Ru | Ru-3SiO2 | 6 | 3 | 8 | 2 | 16.26 | A |
| 1-7 | Ru | Ru-3SiO2 | 6 | 8 | 8 | 2 | 16.10 | B |
| 2-1 | Ru | Ru | 6 | 4 | 8 | 2 | 15.70 | AA |
| 2-2 | Ru | Ru-SiO2 | 6 | 4 | 8 | 2 | 16.14 | AA |
| 2-3 | Ru | Ru-3SiO2 | 6 | 4 | 8 | 2 | 16.30 | AA |
| 2-4 | Ru | Ru-5SiO2 | 6 | 4 | 8 | 2 | 16.24 | A |
| 2-5 | Ru | Ru-10SiO2 | 6 | 4 | 8 | 2 | 16.11 | A |
| 2-6 | Ru | Ru-12SiO2 | 6 | 4 | 8 | 2 | 15.53 | C |
| 3-1 | Ru | Ru-3SiO2 | 6 | 4 | 8 | 0 | 15.85 | A |
| 3-2 | Ru | Ru-3SiO2 | 6 | 4 | 8 | 0.5 | 16.11 | A |
| 3-3 | Ru | Ru-3SiO2 | 6 | 4 | 8 | 1 | 16.13 | A |
| 3-4 | Ru | Ru-3SiO2 | 6 | 4 | 8 | 2 | 16.30 | AA |
| 3-5 | Ru | Ru-3SiO2 | 6 | 4 | 8 | 3 | 16.17 | A |
| 3-6 | Ru | Ru-3SiO2 | 6 | 4 | 8 | 5 | 15.66 | B |
| 4-1 | Ru | Ru-3TiO2 | 6 | 4 | 8 | 2 | 16.22 | A |
| 4-2 | Ru | Ru-3Cr2O3 | 6 | 4 | 8 | 2 | 16.11 | AA |
| 4-3 | Ru | Ru-3SiO2 | 6 | 4 | 8 | 2 | 16.30 | AA |
| 4-4 | Ru | Ru-3RuO2 | 6 | 4 | 8 | 2 | 16.13 | AA |
| 4-5 | Ru | Ru-3Co3O4 | 6 | 4 | 8 | 2 | 16.23 | A |
| 4-6 | Ru | Ru-3WO3 | 6 | 4 | 8 | 2 | 16.02 | A |
| 4-7 | Ru | Ru-3MgO | 6 | 4 | 8 | 2 | 16.01 | A |
| 5-1 | Ru | Ru-3SiO2 | 6 | 4 | 8 | 2 | 16.30 | AA |
| 5-2 | Ru-0.5SiO2 | Ru-3SiO2 | 6 | 4 | 8 | 2 | 16.33 | A |
| 5-3 | Ru-1.0SiO2 | Ru-3SiO2 | 6 | 4 | 8 | 2 | 16.19 | A |
| 5-4 | Ru-2.0SiO2 | Ru-3SiO2 | 6 | 4 | 8 | 2 | 16.13 | A |
| 5-5 | Ru-3.0SiO2 | Ru-3SiO2 | 6 | 4 | 8 | 2 | 15.91 | B |

METHOD OF MANUFACTURING A PERPENDICULAR MAGNETIC DISC

TECHNICAL FIELD

The present invention relates to a method of manufacturing a perpendicular magnetic disk implemented on an HDD (hard disk drive) of a perpendicular magnetic recording type or the like.

BACKGROUND ART

With an increase in capacity of information processing in recent years, various information recording technologies have been developed. In particular, the surface recording density of an HDD using magnetic recording technology is continuously increasing at an annual rate of approximately 50%. In recent years, an information recording capacity exceeding 320 gigabytes per platter has been desired for a magnetic recording medium with a 2.5-inch diameter for use in an HDD or the like. To fulfill such demands, an information recording density exceeding 500 gigabits per square inch is desired to be achieved.

Important factors for increasing recording density of the perpendicular magnetic disk include, for example, an improvement in TPI (Tracks per Inch) by narrowing the track width, ensuring electromagnetic conversion characteristics, such as a Signal-to-Noise Ratio (SNR) and an overwrite (OW) characteristic at the time of improving BPI (Bits per Inch), and further ensuring heat fluctuation resistance with recording bits decreased due to the above. Among these, an increase in SNR in a high recording density condition is important.

In a magnetic layer of a granular structure (hereinafter referred to as a granular magnetic layer), which goes mainstream in recent years, a nonmagnetic substance having an oxide as a main component is segregated around magnetic particles having a CoCrPt alloy growing in a columnar shape to form a grain boundary part. In this structure, since the magnetic particles are separated from each other, noise is reduced, and this is effective for a high SNR. An important factor to further increase the SNR is to microfabricate crystal particles, equalize particle diameters (which are collectively referred to as "particle diameter control), isolate the crystal particles, and improve crystal orientation. Co takes a hcp structure (a hexagonal close-packed crystal lattice structure), and a c-axis direction (an axial direction of a hexagonal column as a crystal lattice) serves as an axis of easy magnetization. Therefore, by orienting the c axis of each of more crystals in a more perpendicular direction, noise is reduced and signals become strong, which can cause an increase in SNR as a synergy effect.

Meanwhile, when a film of crystals is formed on crystals by sputtering, crystal orientation tends to be improved as the film thickness becomes thicker due to epitaxial growth. Thus, to microfabricate crystal particles, equalize particle diameters, and enhance crystal orientation of a granular magnetic layer from an initial growth stage, conventionally performed are processes of forming a film of a ground layer (which is also called an intermediate layer) made of Ru, which is a metal with a hcp structure, and then forming a film of the granular magnetic layer on the ground layer.

While Ti, V, Zr, and Hf are known as examples of a material for use in the ground layer, as described in Patent Document 1, Ru (ruthenium) currently goes mainstream. The reason for this is such that Ru takes a hcp structure, can effectively improve perpendicular orientation of the axis of easy magnetization of a granular magnetic layer having Co (cobalt) as a main component, and can achieve a high SNR.

It is also known that the function of the film of the ground layer varies by the pressure of an atmospheric gas in a film formation process even if the material is the same. For example, Patent Document 2 suggests the structure having, as a ground film of a perpendicular magnetic layer, a layer containing ruthenium with its film being formed under a high-pressure argon atmosphere (on the order of 6 Pa to 10 Pa) and a layer containing ruthenium with its film being formed under a low-pressure argon atmosphere (in the neighborhood of 1 Pa). With this, according to the document, an effect is achieved in which the magnetic layer becomes highly oriented in the low-pressure Ru layer and the magnetic layer have fine particles in the high-pressure Ru layer.

Patent Document 3 (Japanese Unexamined Patent Application Publication No. 2008-140460) also suggests a technology in which, by adding oxygen or an oxide to a ground layer made of Ru, the added substance is segregated between Ru to isolate particles of Ru and promote isolation of magnetic particles of a granular magnetic layer formed as a film on the ground layer.

PRIOR ART DOCUMENTS

Patent Documents

Patent Document 1: Japanese Unexamined Patent Application Publication No. 7-334832
Patent Document 2: Japanese Unexamined Patent Application Publication No. 2002-197630
Patent Document 3: Japanese Unexamined Patent Application Publication No. 2008-140460

DISCLOSURE OF INVENTION

Problems to be Solved by the Invention

In Patent Document 3 described above, by decreasing a film-formation speed under a high-pressure argon atmosphere to form a film of a high-pressure Ru layer, fine holes are formed on its coat, thereby achieving microfabrication and isolation of the crystal particles. However, the presence of fine holes means a rough state of the coat. Therefore, the high-pressure Ru layer has a low coating strength and tends to have a damage or loss occur due to a contact with a magnetic head, and therefore is a cause of inviting a decrease in reliability of the perpendicular magnetic disk.

In view of these problems, an object of the present invention is to provide a method of manufacturing a perpendicular magnetic disk capable of improving reliability while ensuring a high SNR.

Means for Solving the Problem

The inventors studied to solve the above problems and thought that reliability can be improved by making the film thickness of the high-pressure Ru layer thinner to decrease the height of asperities occurring due to a contact with the magnetic head. However, when the high-pressure Ru layer is made thinner, microfabrication and isolation of the crystal particles of Ru do not reach a desired degree, and the effect to be given to the magnetic particles of the granular magnetic layer is decreased.

Here, it can be thought that a film of a hard metal layer is formed on the high-pressure Ru layer. However, in this scheme, the film of the metal layer is formed on the entire surface of the high-pressure Ru layer, and the fine holes purposely formed in the high-pressure Ru layer are filled to degrease separability. Moreover, it can be thought that, in place of forming a film of a Ru ground layer on an upper side at a high pressure, an oxide is contained for microfabrication and isolation of the Ru particles. However, even when a film of Ru containing an oxide is simply formed on a film of a Ru ground layer on a lower side formed at a low pressure, microfabrication and isolation cannot be promoted more than when the film is formed at a high pressure.

Thus, as a result of further studies, the invention was completed based on the thought that a high SNR and reliability can both be achieved if the effect of separability and isolation by a high-pressure Ru layer can be kept and a coat that is denser and higher in strength than the high-pressure Ru layer can be formed on the high-pressure Ru layer.

That is, a typical structure of the method of manufacturing a perpendicular magnetic disk according to the present invention includes: a first ground layer film forming step of forming, on a base, a film of a first ground layer made of Ru or a Ru alloy under an atmospheric gas at a first pressure; a second ground layer film forming step of forming, on the first ground layer, a film of a second ground layer made of Ru or a Ru alloy under an atmospheric gas at a second pressure higher than a first pressure; a third ground layer film forming step of forming, on the second ground layer, a film of a third ground layer having Ru or a Ru alloy as a main component and an oxide as an accessory component under an atmospheric gas at a third pressure higher than the first pressure and lower than the second pressure; and a granular magnetic layer film forming step of forming, on a layer above the third ground layer, a film of a granular magnetic layer in which a non-magnetic substance having an oxide as a main component is segregated around magnetic particles having an CoCrPt alloy grown in a columnar shape as a main component to form a grain boundary part.

According to the structure described above, when the first pressure at which a film of the first ground layer is formed is assumed to be a low pressure, a film of the second ground layer to be formed at the second pressure higher than the first pressure is a film of a layer to be formed at a high pressure. Therefore, in the film of the second ground layer to be formed at a high pressure, microfabrication and isolation of its Ru crystal particles are promoted. The Ru crystal particles of a film of the third ground layer formed on the second ground layer grow by inheriting the Ru crystal particles of the second ground layer, and are in a state of being microfabricated and isolated. Also, since the third ground layer contains an oxide, the oxide is segregated between the Ru crystal particles, thereby further promoting microfabrication and isolation. Therefore, the third ground layer can keep the effect of promoting microfabrication and isolation of the magnetic particles of the granular magnetic layer by the high-pressure Ru layer, that is, the second ground layer.

Also, since the microfabrication and isolation of the Ru crystal particles are achieved also in the third ground layer in a manner as described above, the film of the third ground layer is not required to be formed at a high pressure to achieve microfabrication and isolation. Therefore, the film of the third ground layer can be formed at a pressure lower than that of the second ground layer, that is, an intermediate pressure. With this, the third ground layer is in a dense state with holes less than those of the second ground layer. Still further, with the film of the third ground layer being formed at an intermediate pressure, flatness of its surface is increased, and therefore the magnetic particles of the granular magnetic layer can more suitably grow, thereby achieving a further improvement in crystal orientation. Therefore, by forming a film of the third ground layer, it is possible to increase the strength of coat to ensure reliability while keeping the effects of separation and isolation to increase the SNR.

The oxide as the accessory component preferably has a content equal to or larger than 1 mole percent and equal to or smaller than 10 mole percent. Within this range, it is possible to suitably promote microfabrication and isolation of the Ru particles in the third ground layer. Note that if the content is smaller than 1 mole percent, the amount of the oxide to be segregated between Ru crystal particles is too small, and therefore microfabrication and isolation of the Ru crystal particles when the film of the third ground layer is formed at an intermediate pressure cannot be sufficiently ensured. On the other hand, if the content is higher than 10 mole percent, the amount is too much, and therefore an oxide that cannot be precipitated occurs between Ru crystal particles, inhibiting a columnar-shape growth of the Ru crystal particles and, by extension, possibly decreasing crystal orientation of the granular magnetic layer. Therefore, this is not preferable.

The oxide as the accessory component is preferably an oxide of an element selected from the group of Si, Ti, Cr, Ru, and Co. Among these elements, since Ru is a main component of the ground layer, there is an advantage of not disturbing crystal orientation of the Ru crystal particles in the ground layer. Also, Cr and Co are the same elements as those of main components of the magnetic particles of the film of the granular magnetic layer formed on the ground layer, and Si and Ti are the same elements as those of main components of the grain boundary part of the granular magnetic layer. Therefore, these oxides do not serve as impurities with respect to the granular magnetic layer, and therefore there is an advantage of not exerting an adverse effect on the granular magnetic layer.

The third ground layer preferably has a film thickness equal to or larger than 0.5 nm and equal to or smaller than 3 nm. If the film thickness is smaller than 0.5 nm, the film is too thin to protect the second ground layer, and therefore an improvement in reliability cannot be sufficiently achieved. Also, as described above, crystal orientation of the film formed by sputtering tends to be improved as the film thickness becomes thicker due to epitaxial growth. Therefore, if the film thickness is thin, a columnar-shape growth of the Ru crystal particles in the third ground layer is not sufficient, thereby inviting a decrease in its crystal orientation and, by extension, crystal orientation of the granular magnetic layer. On the other hand, if the film thickness exceeds 3 nm, microfabrication of the Ru crystal particles in the third ground layer is too promoted, resulting in a degradation of crystal orientation of the granular magnetic layer.

In the second ground layer film forming step, the film of the second ground layer is formed, the second ground layer preferably having the Ru or the Ru alloy as the main component and the oxide as the accessory component equal to or smaller than 2 mole percent. With this, it is possible to further promote microfabrication and isolation of the Ru crystal particles in the second ground layer and achieve further microfabrication and isolation of the Ru crystal particles of the third ground layer and, by extension, the magnetic particles of the granular magnetic layer. Therefore, the SNR can be further increased. Note that it is not preferable to put an oxide having an amount exceeding 2 mole percent because crystal orientation of the second ground layer is decreased.

Effect of the Invention

According to the present invention, a method of manufacturing a perpendicular magnetic disk capable of improving reliability while ensuring a high SNR can be provided.

BEST MODES FOR CARRYING OUT THE INVENTION

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference character and are not redundantly described, and components not directly relating to the present invention are not shown in the drawings.

(Perpendicular Magnetic Disk and its Manufacturing Method)

Figure 1:
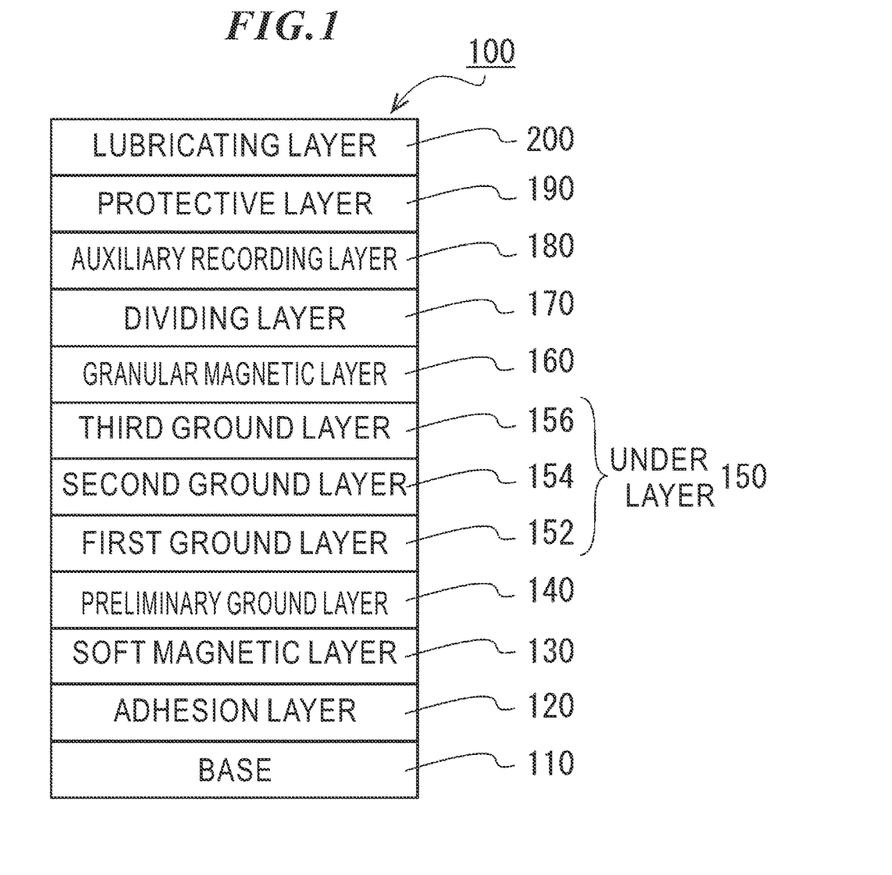
FIG. 1 A diagram for describing a structure of a perpendicular magnetic disk according to an embodiment.

FIG. 1 is a diagram for describing the structure of a perpendicular magnetic disk 100 according to an embodiment. The perpendicular magnetic disk 100 depicted in FIG. 1 is configured of a base 110, an adhesion layer 120, a soft magnetic layer 130, a preliminary ground layer 140, a ground layer 150 (including a first ground layer 152, a second ground layer 154, and a third ground layer 156), a granular magnetic layer 160, a dividing layer 170, an auxiliary recording layer 180, a protective layer 190, and a lubricating layer 200.

As the base 110, for example, a glass disk obtained by molding amorphous aluminosilicate glass in a disk shape by direct pressing can be used. Note that the type, size, thickness, and others of the glass disk are not particularly restricted. Examples of a material of the glass disk include, for example, aluminosilicate glass, soda lime glass, soda aluminosilicate glass, aluminoborosilicate glass, borosilicate glass, quartz glass, chain silicate glass, and glass ceramic such as crystallized glass. By sequentially grinding, polishing, and then chemically strengthening any of these glass disks, the flat, nonmagnetic base 110 formed of a chemically-strengthen glass disk can be obtained.

On the base 110, films of the adhesion layer 120 to the auxiliary recording layer 180 are sequentially formed by DC magnetron sputtering, and a film of the protective layer 190 can be formed by CVD. Thereafter, the lubricating layer 200 can be formed by dip coating. The structure of each layer is described below.

The adhesion layer 120 is formed so as to be in contact with the base 110, and has a function of enhancing a close contact strength between the film of the soft magnetic layer 130 formed thereon and the base 110. The adhesion layer 120 is preferably an amorphous alloy film, such as a CrTi-base amorphous alloy, a CoW-base amorphous alloy, a CrW-base amorphous alloy, a CrTa-base amorphous alloy, or a CrNb-base amorphous alloy. The adhesion layer 120 can have a film thickness, for example, on the order of 2 nm to 20 nm. The adhesion layer 120 may be a single layer, and may be formed by laminating a plurality of layers.

The soft magnetic layer 130 functions as helping facilitate writing of a signal in the magnetic recording layer and increase density by convergence of a write magnetic field from the head when a signal is recorded by a perpendicular magnetic recording scheme. As a soft magnetic material, in addition to a cobalt-base alloy such as CoTaZr, any of materials having soft magnetic characteristics can be used, including an FeCo-base alloy, such as FeCoCrB, FeCoTaZr, or FeCoNiTaZr, and a NiFe-base alloy. Also, by involving a spacer layer made of Ru approximately in the middle of the soft magnetic layer 130, the structure can be configured so as to have AFC (Antiferro-magnetic exchange coupling). With this, perpendicular components of magnetization can be extremely decreased, and therefore noise occurring from the soft magnetic layer 130 can be reduced. In the case of the structure in which a spacer layer is involved, the film thickness of the soft magnetic layer 130 can be such that the spacer layer has a film thickness on the order of 0.3 nm to 0.9 nm and layers thereabove and therebelow made of a soft magnetic material each have a film thickness on the order of 10 nm to 50 nm.

The preliminary ground layer 140 includes a function of promoting crystal orientation of the ground layer 150 formed thereabove and a function of controlling a microfabricated structure, such as a particle diameter. The preliminary ground layer 140 may have a hcp structure, but preferably has a face-centered cubic structure (a fcc structure) in which a (111) surface is parallel to a main surface of the base 110. Examples of the material of the preliminary ground layer 140 can include Ni, Cu, Pt, Pd, Ru, Co, and Hf, and an alloy having any of the above-described metals as a main component and having added thereto one or more of V, Cr, Mo, W, Ta, and others. Specifically, a selection can be suitably made from NiV, NiCr, NiTa, NiW, NiVCr, CuW, CuCr, and others. The preliminary ground layer 140 can have a film thickness on the order of 1 nm to 20 nm. Also, the preliminary ground layer 140 may have a plural-layer structure.

The ground layer 150 is a layer having a hcp structure, having a function of promoting crystal orientation of magnetic crystal particles in the hcp structure of the granular magnetic layer 160 formed thereabove and a function of controlling microfabricated structure, such as a particle diameter, and serving as a so-called basis of a granular structure. Ru has a hcp structure as that of Co, and a lattice space of the crystal is similar to that of Co. Therefore, by having Ru contained in the ground layer 150, magnetic particles having Co as a main component can be excellently orientated. Therefore, as crystal orientation of the ground layer 150 is higher, crystal orientation of the granular magnetic layer 160 can be improved. Also, by microfabricating the particle diameter of the ground layer 150, the particle diameter of the granular magnetic layer 160 can be microfabricated. As described above, while Ru is suitable as a material of the ground layer 150, in addition, an alloy with a metal, such as Cr or Co (a Ru alloy) can be used, or an oxide can be added.

In the present embodiment, by changing gas pressure at the time of sputtering, the ground layer 150 is formed in a three-layer structure. Specifically, first, on an upper layer (in the present embodiment, on the preliminary ground layer 140) of the base 110, a film of the first ground layer 152 made of Ru or a Ru alloy is formed under an atmospheric gas at a first pressure (a first ground layer film forming process). Next, on the first ground layer 152, a film of the second ground layer 154 made of Ru or a Ru alloy is formed under an atmospheric gas at a second pressure higher than the first pressure (a second ground layer film forming process). The film thickness of each of the first ground layer 152 and the second ground layer 154 can be, for example, on the order of 5 nm to 40 nm. Then, on the second ground layer 154, a film of the third ground layer 156 having Ru or a Ru alloy as a main component and an oxide as an accessory component is formed under an atmospheric gas at a third pressure higher than the first pressure and lower than the second pressure (a third ground layer film forming process).

When the first pressure in the first ground layer film forming process is a low pressure, the film of the second ground layer 154 is formed at the second pressure higher than the first pressure, that is, at a high pressure. Therefore, in the film of the second ground layer 154 to be formed at a high pressure, microfabrication and isolation of its Ru crystal particles are promoted. Then, when the film of the third ground layer 156 is formed on this second ground layer 154, the Ru crystal particles inherit the Ru crystal particles in the second ground layer 154 to grow, thereby being in a microfabricated and isolated state.

Furthermore, since the third ground layer 156 contains an oxide, the oxide is segregated between the Ru crystal particles. With this, microfabrication and isolation of the third ground layer 156 are further promoted. Therefore, the third ground layer 156 can keep the effect of promoting microfabrication and isolation of the magnetic particles of the granular magnetic layer 160 by the second ground layer 154.

As described above, by having an accessory component contained in the third ground layer 156, microfabrication and isolation of its Ru crystal particles can be achieved. Thus, the film of the third ground layer 156 is not required to be formed at a high pressure to be microfabricated and isolated. Therefore, the film of the third ground layer 156 can be formed at an intermediate pressure, which is a pressure lower than that of the second ground layer 154, and thus its coat is in a dense state with holes less than those of the second ground layer 154. With this, the strength of the coat can be increased to ensure reliability. Also by forming the film of the third ground layer 156 at an intermediate pressure, the flatness of its surface is increased, and therefore the magnetic particles of the granular magnetic layer 160 can more suitably grow, thereby further improving crystal orientation. For this reason, by providing the third ground layer 156 of the present embodiment, the effect of separability and isolation of the ground layer 150 and, by extension, the granular magnetic layer 160 can be kept while reliability is being improved, thereby allowing a high SNR to be ensured.

As an oxide as an accessory component to be contained in the third ground layer 156, an oxide of an element selected from the group of Si, Ti, Cr, Ru, and Co can be suitably used. Among these elements, since Ru is a main component of the ground layer, crystal orientation of the Ru crystal particles in the ground layer 150 is not disturbed.

Also, Cr and Co are the same elements as those of main components of the magnetic particles of the film of the granular magnetic layer 160 formed on the ground layer, and Si and Ti are the same elements as those of main components of the grain boundary part of the granular magnetic layer 160. Therefore, these oxides do not serve as impurities with respect to the granular magnetic layer 160, and therefore an adverse effect is not exerted on the granular magnetic layer 160.

The oxide as the accessory component preferably has a content equal to or larger than 1 mole percent and equal to or smaller than 10 mole percent. If the content is smaller than 1 mole percent, segregation of the oxide between Ru crystal particles is insufficient, and therefore microfabrication and isolation of the Ru crystal particles when the film of the third ground layer 156 is formed at an intermediate pressure cannot be sufficiently ensured. On the other hand, if the content is higher than 10 mole percent, an oxide that cannot be segregated occurs between Ru crystal particles and a growth of the Ru crystal particles in a columnar shape is inhibited, and therefore this is not preferable. Thus, with the content of the oxide being within this range, microfabrication and isolation of the Ru particles in the third ground layer 156 can be suitably promoted.

Furthermore, the third ground layer 156 preferably has a film thickness equal to or larger than 0.5 nm and equal to or smaller than 3 nm. If the film thickness is smaller than 0.5 nm, the film is too thin to protect the second ground layer 154, and therefore an improvement in reliability cannot be sufficiently achieved. Also, crystal orientation of the film formed by sputtering tends to be improved as the film thickness becomes thicker due to epitaxial growth. Therefore, if the film thickness is thin, a columnar-shape growth of the Ru crystal particles in the third ground layer 156 is not sufficient, thereby inviting a decrease in crystal orientation of this third ground layer 156 and, by extension, crystal orientation of the granular magnetic layer 160. On the other hand, if the film thickness exceeds 3 nm, microfabrication of the Ru crystal particles in the third ground layer 156 is too promoted, resulting in a degradation of crystal orientation of the granular magnetic layer 160. Therefore, the range of the film thickness of the third ground layer 156 is suitable within the range above.

Also, the oxide as an accessory component may be contained in the second ground layer 154. That is, in the second ground layer film forming process, a film of the second ground layer 154 having Ru or a Ru alloy as a main component and an oxide as an accessory component can be formed. With this, microfabrication and isolation of the Ru crystal particles in the second ground layer 154 can be further promoted, and microfabrication and isolation of the magnetic particles in the granular magnetic layer 160 can further be achieved, and therefore the SNR can be further increased.

However, when an oxide as an accessory component is contained in the second ground layer 154, its content is set so as to be equal to or smaller than 2 mole percent. The reason for this is that, if an oxide having an amount higher than 2 mole percent is put, degradation of crystal orientation of the second ground layer 154 is invited.

A film of the granular magnetic layer 160 is formed on a layer above the third ground layer 156 (a granular magnetic layer film forming process). This granular magnetic layer 160 has a granular structure in which a nonmagnetic substance having an oxide as a main component is segregated around magnetic particles with ferromagnetic properties having a Co—Pt-base alloy (in the present embodiment, a CoCrPt alloy) growing in a columnar shape as a main component to form a ground boundary. For example, by forming a film with the use of a target obtained by mixing $SiO_2$, $TiO_2$, or the like in a CoCrPt-base alloy, $SiO_2$ or $TiO_2$, which is a nonmagnetic substance, is segregated around the magnetic particles (grains) formed of the CoCrPt-base alloy to form a grain boundary, and a granular structure with the magnetic particles growing in a columnar shape can be formed.

Note that the substance for use in the granular magnetic layer 160 described above is merely an example, and is not restrictive. As a CoCrPt-base alloy, one or more types of B, Ta, Cu, Ru, and others may be added to CoCrPt. Also, examples of a nonmagnetic substance for forming a grain boundary can include oxides, such as silicon oxide ($SiO_2$), titanium oxide ($TiO_2$), chrome oxide ($Cr_2O_3$), zircon oxide ($ZrO_2$), tantalum oxide ($Ta_2O_5$), cobalt oxide (CoO or $Co_3O_4$). Also, not only one type of oxide but also two or more types of oxide can be combined for use.

The dividing layer 170 is provided between the granular magnetic layer 160 and the auxiliary recording layer 180, and has an action of adjusting the strength of exchange coupling between these layers. With this, the strength of a magnetic interaction acting between the granular magnetic layer 160 and the auxiliary recording layer 180 and between adjacent magnetic particles in the granular magnetic layer 160 can be adjusted. With this, while magnetostatic values, such as Hc and Hn, relating to heat fluctuation resistance are kept, recording and reproduction characteristics, such as an overwrite characteristic and an SNR characteristic, can be improved.

The dividing layer 170 is preferably a layer having a hcp crystal structure and having Ru or Co as a main component so as not to decrease inheritance of crystal orientation. As a Ru-base material, in addition to Ru, a material obtained by adding another metal, oxygen, or an oxide to Ru can be used. Also, as a Co-base material, a CoCr alloy or the like can be used. Specific examples include Ru, RuCr, RuCo, Ru—$SiO_2$, Ru—$WO_3$, Ru—$TiO_2$, CoCr, CoCr—$SiO_2$, CoCr—$TiO_2$, or the like can be used. Note that a nonmagnetic material is normally used for the dividing layer 170, but the dividing layer 170 may have low magnetic properties. Furthermore, in order to obtain excellent exchange coupling strength, the dividing layer 170 may preferably have a film thickness within 0.2 nm to 1.0 nm.

Still further, the dividing layer 170 has an action to the structure to promote separation of the crystal particles of the upper auxiliary recording layer 180. For example, even when the upper layer is made of a material not containing a nonmagnetic substance, such as an oxide, the grain boundary of the magnetic crystal particles can be clarified.

Note that while the structure in the present embodiment is such that the dividing layer 170 is provided between the granular magnetic layer 160 and the auxiliary recording layer 180, this is not meant to be restrictive. Therefore, the structure can be such that a film of the auxiliary recording layer 180 is formed immediately above the granular magnetic layer 160 without provision of the dividing layer 170.

The auxiliary recording layer 180 is a magnetic layer magnetically approximately continuous in an in-plane direction of a main surface of the base. Since the auxiliary recording layer 180 has a magnetic interaction (exchange coupling) with respect to the granular magnetic layer 160, magnetostatic characteristics, such as a coercive force Hc and an inverted-magnetic-domain nucleation magnetic field Hn, can be adjusted. With this, an object is to improve heat fluctuation resistance, an OW characteristic, and an SNR. As a material of the auxiliary recording layer 180, a CoCrPT alloy can be used and, furthermore, an additive, such as B, Ta, Cu, or the like, may be added. Specifically, CoCrPt, CoCrPtB, CoCrPtTa, CoCrPtCu, CoCrPtCuB, and others can be used. Furthermore, the auxiliary recording layer 180 can have a film thickness of, for example, 3 nm to 10 nm.

Note that "magnetically continuous" means that magnetic properties continue without interruption. "approximately continuous" means that the auxiliary recording layer 180 is not necessarily a single magnet when observed as a whole but the magnetic properties may be partially discontinuous. That is, the auxiliary recording layer 180 can have continuous magnetic properties across (so as to cover) a collective body of a plurality of magnetic particles. As long as this condition is satisfied, the auxiliary recording layer 180 may have a structure in which, for example, Cr is segregated.

The protective layer 190 is a layer for protecting the perpendicular magnetic disk 100 from a shock from the magnetic head. The protective layer 190 can be formed by forming a film containing carbon by CVD. In general, a carbon film formed by CVD has an improved film hardness compared with a film formed by sputtering, and therefore is suitable because it can more effectively protect the perpendicular magnetic disk 100 from a shock from the magnetic head. The protective layer 190 can have a film thickness of, for example, 2 nm to 6 nm.

The lubricating layer 200 is formed so as to prevent damage on the protective layer 190 when the magnetic head makes contact with the surface of the perpendicular magnetic disk 100. For example, a film can be formed by applying PFPE (perfluoropolyether) by dip coating. The lubricating layer 200 can have a film thickness of, for example, 0.5 nm to 2.0 nm.

Examples

Figure 2:
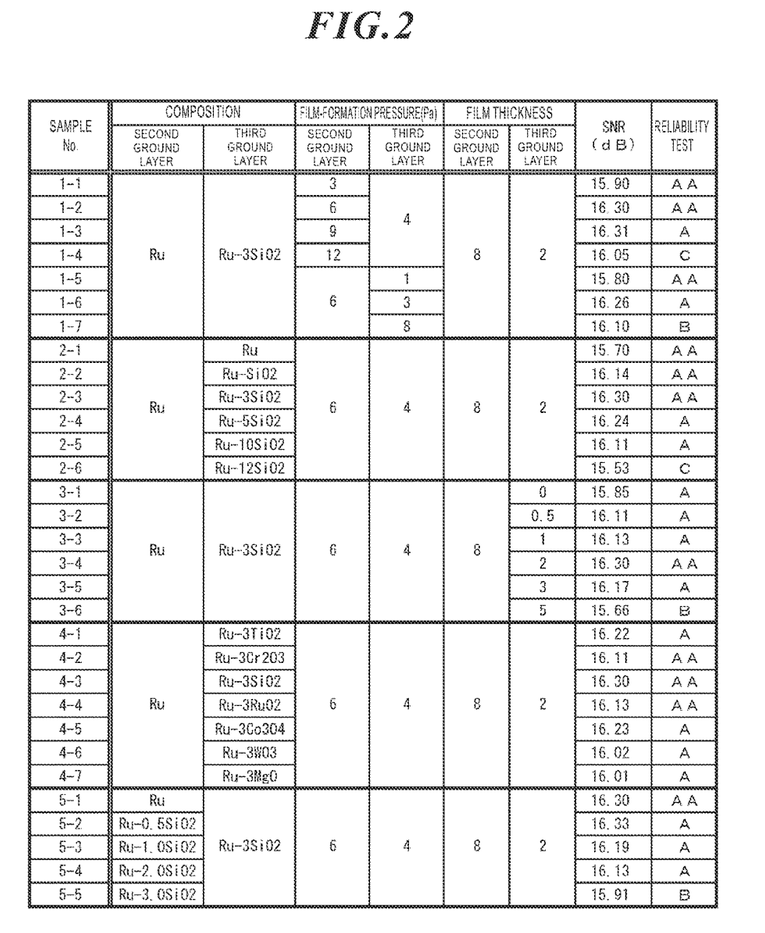
FIG. 2 A drawing for comparing and describing various components as being changed.

To confirm effectiveness of the above-structured perpendicular magnetic disk 100 manufactured by using the manufacturing method described above, description is made by using samples as examples below. FIG. 2 is a drawing for comparing and describing various components as being changed. Here, it can be said that reliability of the perpendicular magnetic disk 100 means durability thereof, in other words. Therefore, in reliability tests shown in FIG. 2, scratch tests by a needle, which are durability evaluation tests, were adopted, and evaluations were made in four steps, with "AA" when an abrasion mark in the scratch tests has a depth smaller than 0.5 nm, "A" when the depth is equal to or larger than 0.5 nm and smaller than 1.0 nm, "B" when the depth is equal to or larger than 1.0 nm and smaller than 3.0 nm, and "C" when the depth is equal to or larger than 3.0 nm.

As an example, on the base 110, by using a vacuumed film forming device, films of the adhesion layer 120 to the auxiliary recording layer 132 were sequentially formed in an Ar atmosphere by DC magnetron sputtering. Note that the Ar gas pressure at the time of film formation is 0.6 Pa unless otherwise specified. For the adhesion layer 120, a film was formed of Cr-50Ti so as to have 10 nm. For the soft magnetic layer 130, films were formed of 92(40Fe-60Co)-3Ta-5Zr so as to interpose a Ru layer of 0.7 nm therebetween and each have 20 nm. For the preliminary ground layer 140, a film was formed of Ni-5W so as to have 8 nm. For the first ground layer 152, a film was formed of Ru at 0.6 Pa (the first pressure: a low pressure) so as to have 10 nm. For the second ground layer 154, with formation of a basic structure in which a film of Ru on the first ground layer 152 at 6.0 Pa (the second pressure: a high pressure) so as to have 8 nm being taken as a basic structure, the film formation pressure was changed as described below for comparison. For the third ground layer 156, with formation of a film having Ru or a Ru alloy as a main component and SiO2, which is an oxide of Si, as an accessory component on the second ground layer 154 at 4.0 Pa (the second pressure: an intermediate pressure)

so as to have 2 nm being taken as a basic structure, the film formation pressure, composition, and film thickness were changed as described below for comparison. For the granular magnetic layer 160, a film was formed of 90(70Co-10Cr-20Pt)-10($Cr_2O_3$) at 3 Pa so as to have 2 nm and then a film was formed thereon of 90(72Co-10Cr-18Pt)-5($SiO_2$)-5 ($TiO_2$) at 3 Pa so as to have 12 nm. For the dividing layer 170, a film was formed of Ru so as to have 0.3 nm. For the auxiliary recording layer 180, a film was formed of 62Co-18Cr-15Pt-5B so as to have 6 nm. For the protective layer 190, a film was formed by using $C_2H_4$ by CVD so as to have 4.0 nm, and then its surface layer was nitrided. The lubricating layer 200 was formed by using PFPE by dip coating so as to have 1 nm.

Note that, in FIG. 3, the first pressure (0.6 Pa) when the film of the first ground layer 152 is formed in the basic structures of the first ground layer 152 and the second ground layer 156 described above is defined as a low pressure, and the second pressure (6.0 Pa) when the film of the second ground layer 154 is formed therein is defined as a high pressure. Therefore, a range higher than the first pressure and lower than the third pressure is defined as an intermediate pressure.

In samples 1-1 to 1-4 shown in FIG. 2, the film formation pressure for the second ground layer 154 is changed to 3 Pa, 6 Pa, 9 Pa, and 12 Pa. With reference to the SNR of each sample and the results of the reliability tests, it can be found that, first as in the sample 1-1, when the film formation pressure is 3 Pa, that is, an intermediate pressure lower than the high pressure, while reliability is extremely superior, but a high SNR cannot be obtained. The reason for this can be thought such that, when the film of the second ground layer 154 is formed at the intermediate pressure, the coat is in a state denser than that at the time of high-pressure film formation, and therefore reliability can be improved, but promotion of microfabrication and isolation of the Ru crystal particles is insufficient and an increase in SNR cannot be achieved.

Then, when the film formation pressure is increased, the SNR is peaked at 6 Pa to 9 Pa (in the samples 1-2 and 1-3), and excellent reliability can be obtained. Then, when the pressure reaches 12 Pa (in the sample 1-4), while the SNR is higher than that at the time of low-pressure film formation (in the sample 1-1), reliability is significantly decreased. The reason for this can be thought such that since the film formation pressure is too high, microfabrication of the Ru crystal particles of the second ground layer 154 is too promoted, degrading crystal orientation and, by extension, the SNR, and the second ground layer 154 becomes too rough, inviting a decrease in reliability. From these, it can be found that an appropriate film formation pressure for the second ground layer 154 is a high pressure and its range is 6 Pa to 9 Pa.

On the other hand, in samples 1-5 to 1-7, the film formation pressure for the third ground layer 156 is changed to 1 Pa, 3 Pa, and 8 Pa, respectively. With reference to the SNRs of the samples 1-5 to 1-7 and the sample 1-2 in which the film of the third ground layer 156 is formed at 6 Pa and the other conditions are similar to those of these samples, first as in the sample 1-5, even when the film of the third ground layer 156 is formed at a low pressure as 1 Pa close to the film formation pressure of the first ground layer 152, extremely high reliability can be obtained, but a high SNR cannot be obtained. The reason for this can be thought such that, with low-pressure film formation, the third ground layer 156 is in an extremely dense state to increase coat strength to increase reliability, but microfabrication and isolation of the Ru crystal particles are insufficient and the SNR cannot be increased.

Thus, when the film formation pressure is increased, the SNR is peaked at 3 Pa to 4 Pa (the sample 1-6 and the sample 1-2), and good results can also be obtained regarding reliability. Then, when the pressure is further increased to reach a high pressure (the sample 1-7), such as 8 Pa, that is close to the film formation pressure of the second ground layer 154, the SNR is decreased, and reliability is also decreased. The reason for this can be thought such that, as with the second ground layer 154, the coat also becomes rough in the third ground layer 156 and the effect of increasing reliability by the third ground layer 156 cannot be obtained. Therefore, it can be found that an appropriate film formation pressure for the third ground layer 156 is an intermediate pressure and its range is 3 Pa to 4 Pa.

In samples 2-1 to 2-6, the composition of the oxide (SiO2) as an accessory component in the third ground layer 156 is changed (the amount of the oxide contained in the third ground layer 156 is changed). Note that while the sample 2-3 has the same composition as that of the sample 1-2, this sample is again presented for convenience of description.

Compared with the case as in the sample 2-1 in which the third ground layer 156 is made of Ru only, the SNR is dramatically changed when 1 mole percent SiO2 is contained as in the sample 2-2. The reason for this can be thought such that SiO2 (oxide) contained in the third ground layer 156 is segregated between Ru crystal particles to promote microfabrication and isolation.

When the amount of SiO2 is increased as in the samples 2-3 to 2-6, the SNR is further increased to be peaked in the sample 2-3. As in the samples 2-4 and 2-5, when the amount of SiO2 is 5 to 10 mole percent, the SNR is gradually decreased. As in the sample 2-6, when the amount reaches 12 mole percent, the SNR is significantly decreased and a high SNR cannot be obtained. The reason for this can be thought such that since the amount of SiO2 is too much in the sample 2-6, SiO2 that cannot be precipitated between Ru crystal particles inhibits a columnar-shape growth of the Ru crystal particles, and therefore crystal orientation is decreased. From these results, it can be found that the SNR can be increased with an oxide being contained in the third ground layer 156, and it can be understood that the content of the oxide is equal to or larger than 1 mole percent and equal to or smaller than 10 mole percent.

In the samples 3-1 to 3-6, the film thickness of the third ground layer 156 is changed to 0 nm, 0.5 nm, 1 nm, 2 nm, 3 nm, and 5 nm. Note that while the sample 3-4 has the same composition as that of the sample 1-2, this sample is again presented for convenience of description.

In comparison between the sample 3-1 in which the film thickness is 0 nm, that is, the third ground layer 156 is not formed, and the sample 3-2 in which the third ground layer 156 having a film thickness of 0.5 nm is formed, it can be found that the SNR is increased by providing the third ground layer 156. When the film thickness is further increased as in the samples 3-3 and 3-4, the SNR is peaked with a film thickness of 2 nm in the sample 3-4, and an excellent reputation can be obtained also in reliability.

When the film thickness is further increased to reach 3 nm as in the sample 3-5, a slight decrease is started to appear in both of the SNR and reliability. Then, when the film thickness reaches 5 nm as in the sample 3-6, the SNR is significantly decreased. The reason for this can be thought such that when the film thickness reaches 5 nm (exceeds 3 nm), microfabrication of the Ru crystal particles of the third ground layer is too promoted, and crystal orientation of the third ground layer 156 and, by extension, the granular magnetic layer 160 is decreased. For these results, it can be understood that an appropriate film thickness of the third ground layer 156 is equal to or larger than 0.5 nm and equal to or smaller than 3 nm.

In samples 4-1 to 4-5, the type of oxide to be contained in the third ground layer is changed. In detail, as an oxide, TiO2 is contained in the sample 4-1, Cr2O3 is contained in the sample 4-2, SiO2 is contained in the sample 4-3, RuO2 is contained in the sample 4-4, and Co3O4 is contained in the sample 4-5. Also, WO3 is contained in the sample 4-6 and MgO is contained in the sample 4-7. Note that while the sample 4-3 has the same composition as that of the sample 1-2, this sample is again presented for convenience of description.

The oxide contained in each of the samples 4-1 to 4-5 is an oxide of Ru, which is a component material of the third ground layer 156, or an oxide of a component material of the granular magnetic layer 160. In any of these sample, a high SNR can be obtained. On the other hand, as in the samples 4-6 and 4-7, when an oxide of a material different from the component material of the third ground layer 156 or the granular magnetic layer 160 is contained, while an SNR that is high to some degrees can be obtained, the SNR does not exceed those in the samples 4-1 to 4-5. From this, it can be understood that, by using an oxide of the component material of the third ground layer 156 or the granular magnetic layer 160, disturbance in crystal orientation of the Ru crystal particles in the third ground layer 156 and crystal orientation of the magnetic particles in the granular magnetic layer 160 can be prevented to obtain an extremely high SNR.

In samples 5-1 to 5-5, SiO2 is used as an oxide contained in the second ground layer 154, and its amount is changed from 0 mole percent to 3.0 mole percent. Note that while the sample 5-1 has the same composition as that of the sample 1-2, this sample is again presented for convenience of description.

It can be found that, when the sample 5-1 without containing SiO2 and the sample 5-2 containing 0.5 mol percent SiO2, the SNR can be increased by containing SiO2. It can be also found that a high SNR can be obtained also by increasing the content of SiO2 as in the samples 5-3 and 5-4. Contrarily, however, when the content of SiO2 reaches 3.0 mole percent as in the sample 5-5, a decrease of the SNR is invited. The reason for this can be thought that degradation of crystal orientation of the second ground layer 154 is invited because the amount of the oxide is too increased. Therefore, it can be understood that the amount of the oxide to be contained in the second ground layer 154 is suitably equal to or smaller than 2 mole percent.

AS has been described in the foregoing, according to the method of manufacturing the perpendicular magnetic disk 100 of the present embodiment, on the film of the first ground layer 152 formed at a low pressure, the film of the second ground layer 154 formed at a high pressure is formed. Furthermore, on the second ground layer 154, the film of the third ground layer 156 containing an oxide as an accessory component is formed at an intermediate pressure. With this, the perpendicular magnetic disk 100 capable of improving reliability while ensuring a high SNR can be manufactured. And, as described above, by optimizing the amount of the oxide and the film thickness of the third ground layer 156, a perpendicular magnetic disk best in a balance between the SNR and reliability can be obtained.

In the foregoing, the preferred embodiments of the present invention have been described with reference to the attached drawings. Needless to say, however, the present invention is not restricted to these embodiments. It is clear that the person skilled in the art can conceive various modification examples or corrected examples within a range described in the scope of claims for patent, and it is understood that they reasonably belong to the technological scope of the present invention.

INDUSTRIAL APPLICABILITY

The present invention can be used as a method of manufacturing a perpendicular magnetic disk implemented on an HDD of a perpendicular magnetic recording type or the like.

DESCRIPTION OF REFERENCE NUMERALS

100 . . . perpendicular magnetic disk, 110 . . . base, 120 . . . adhesion layer, 130 . . . soft magnetic layer, 140 . . . preliminary ground layer, 150 . . . ground layer, 152 . . . first ground layer, 154 . . . second ground layer, 156 . . . third ground layer, 160 . . . granular magnetic layer, 170 . . . dividing layer, 180 . . . auxiliary recording layer, 190 . . . protective layer, 200 . . . lubricating layer

The invention claimed is:

1. A method of manufacturing a perpendicular magnetic disk comprising:
    a first ground layer film forming step of forming, on a base, a film of a first ground layer made of Ru or a Ru alloy under an atmospheric gas at a first pressure;
    a second ground layer film forming step of forming, on the first ground layer, a film of a second ground layer made of Ru or a Ru alloy under an atmospheric gas at a second pressure higher than the first pressure;
    a third ground layer film forming step of forming, on the second ground layer, a film of a third ground layer consisting of Ru as a main component and an oxide as an accessory component under an atmospheric gas at a third pressure higher than the first pressure and lower than the second pressure; and
    a granular magnetic layer film forming step of forming, on a layer above the third ground layer, a film of a granular magnetic layer in which a non-magnetic substance having an oxide as a main component is segregated around magnetic particles having an CoCrPt alloy grown in a columnar shape as a main component to form a grain boundary part,
    wherein the oxide in the third ground layer consists of oxygen and an element selected from the group consisting of Si, Ti, Cr, Ru, W and Mg.

2. The method of manufacturing a perpendicular magnetic disk according to claim 1, wherein the CoCrPt alloy comprises at least one of B, Ta, Cu and Ru.

3. A method of manufacturing a perpendicular magnetic disk comprising:
    a first ground layer film forming step of forming, on a base, a film of a first ground layer made of Ru or a Ru alloy under an atmospheric gas at a first pressure;
    a second ground layer film forming step of forming, on the first ground layer, a film of a second ground layer made of Ru or a Ru alloy as a main component and an oxide as an accessory component equal to or smaller than 2 mole percent under an atmospheric gas at a second pressure higher than the first pressure;
    a third ground layer film forming step of forming, on the second ground layer, a film of a third ground layer consisting of Ru as a main component and an oxide as an accessory component equal to or larger than 1 mole percent and equal to or smaller than 10 mole percent under an atmospheric gas at a third pressure higher than the first pressure and lower than the second pressure; and a granular magnetic layer film forming step of forming, on the third ground layer, a film of a granular magnetic layer in which a non-magnetic substance having an oxide as a main component is segregated around magnetic particles having a CoCrPt alloy grown in a columnar shape as a main component to form a grain boundary part, wherein the oxide in the third ground layer consists of oxygen and an element of W, wherein the first ground layer film forming step, the second ground layer film forming step and the third ground layer film forming step are conducted in succession, with the second ground layer being formed in contact with the first ground layer and the third ground layer being formed in contact with the second ground layer, wherein the second pressure is 6 Pa to 9 Pa, wherein the third pressure is 3 Pa to 4 Pa, wherein the third ground layer has a film thickness of 0.5 nm-3 nm, and wherein the second ground layer has a film thickness of 5-40 nm.

4. The method of manufacturing a perpendicular magnetic disk according to claim 3, wherein the oxide in the third ground layer has a content equal to or larger than 1 mole percent and equal to or smaller than 5 mole percent.

5. The method of manufacturing a perpendicular magnetic disk according to claim 3 further comprising:

an auxiliary recording layer film forming step of forming, immediately on the granular magnetic layer, a film of an auxiliary recording layer that is magnetically approximately continuous in an in-plane direction of a main surface of the base.

6. The method of manufacturing a perpendicular magnetic disk according to claim 3, wherein the CoCrPt alloy comprises at least one of B, Ta, Cu and Ru.

7. A method of manufacturing a perpendicular magnetic disk comprising:

a first ground layer film forming step of forming, on a base, a film of a first ground layer made of Ru or a Ru alloy under an atmospheric gas at a first pressure;

a second ground layer film forming step of forming, on the first ground layer, a film of a second ground layer made of Ru or a Ru alloy as a main component and an oxide as an accessory component equal to or smaller than 2 mole percent under an atmospheric gas at a second pressure higher than the first pressure;

a third ground layer film forming step of forming, on the second ground layer, a film of a third ground layer consisting of Ru as a main component and an oxide as an accessory component equal to or larger than 1 mole percent and equal to or smaller than 10 mole percent under an atmospheric gas at a third pressure higher than the first pressure and lower than the second pressure; and a granular magnetic layer film forming step of forming, on the third ground layer, a film of a granular magnetic layer in which a non-magnetic substance having an oxide as a main component is segregated around magnetic particles having a CoCrPt alloy grown in a columnar shape as a main component to form a grain boundary part, wherein the oxide in the third ground layer consists of oxygen and an element selected from the group consisting of Si, Ti, Cr, Ru, W and Mg, wherein the first ground layer film forming step, the second ground layer film forming step and the third ground layer film forming step are conducted in succession, with the second ground layer being formed in contact with the first ground layer and the third ground layer being formed in contact with the second ground layer, wherein the second pressure is 6 Pa to 9 Pa, wherein the third pressure is 3 Pa to 4 Pa, wherein the third ground layer has a film thickness of 0.5 nm-3 nm, and wherein the second ground layer has a film thickness of 5-40 nm.

8. The method of manufacturing a perpendicular magnetic disk according to claim 7, wherein the oxide in the third ground layer has a content equal to or larger than 1 mole percent and equal to or smaller than 5 mole percent.

9. The method of manufacturing a perpendicular magnetic disk according to claim 7 further comprising:

a protective layer film forming step of forming, above the granular magnetic layer, a film of a protective layer.

10. The method of manufacturing a perpendicular magnetic disk according to claim 7, wherein the CoCrPt alloy comprises at least one of B, Ta, Cu and Ru.

11. The method of manufacturing a perpendicular magnetic disk to claim 7, further comprising:

an auxiliary recording layer film forming step of forming, immediately on the granular magnetic layer, a film of an auxiliary recording layer that is magnetically approximately continuous in an in-plane direction of a main surface of the base.

12. The method of manufacturing a perpendicular magnetic disk according to claim 11, wherein the oxide in the third ground layer has a content equal to or larger than 1 mole percent and equal to or smaller than 5 mole percent.

13. The method of manufacturing a perpendicular magnetic disk according to claim 11, wherein the oxide in the third ground layer consists of oxygen and an element of W.

* * * * *